United States Patent Office 2,860,157
Patented Nov. 11, 1958

2,860,157

MAKING TRANS N-CARBAMYLAMIC ESTERS

Charles H. Stiteler, Hillsdale, N. J., assignor to United States Rubber Company, New York, N. Y., a corporation of New Jersey No Drawing. Application October 10, 1956
Serial No. 615,007

8 Claims. (Cl. 260—482)

This invention relates to a new method of making esters of trans N-carbamylamic unsaturated acids with hydroxylic compounds containing at least one non-tertiary alcohol group. This method comprises the isomerization of the corresponding esters of cis N-carbamylamic acids into the desired esters in a medium containing water and a tertiary amine.

I have now found that aqueous tertiary amines isomerize the cis esters to the corresponding trans esters rapidly and completely. Anhydrous tertiary amines speed up the isomerization only very weakly if at all.

The cis esters have the structure

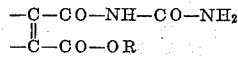

wherein R is the residue of a non-tertiary alcohol which can contain one additional non-tertiary alcoholic hydroxyl group and the remaining carbon bonds are satisfied by hydrogen or alkyl groups which can contain not more than three carbon atoms. These cis esters, among others, are described by Pliny O. Tawney in U. S. Patent No. 2,721,186, dated October 18, 1955.

The cis esters are isomerized by my new process as follows:

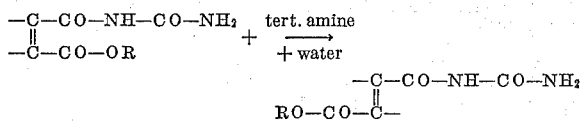

The cis esters are made from the corresponding alcohols and N-carbamylimides, as shown by Tawney. I have also now found that the trans esters can be made from the N-carbamylimides and alcohols, in the presence of water and a tertiary amine, without isolating the intermediate cis esters. This is surprising because the N-carbamylimides used in this invention are known to react easily with water to form the corresponding cis N-carbamylamic acids, which do not react with alcohols under the conditions of this invention. Thus it was thought that most or all of the N-carbamylimide would form the unwanted cis acid. Actually, the cis acid is formed in minor amount, and most of the N-carbamylimide reacts with the alcohol. The cis ester is formed directly in the latter reaction, but is isomerized rapidly to the corresponding trans ester. Therefore, this invention encompasses both the isomerization of previously formed cis carbamylamic esters to the trans esters, and the formation of the trans esters from the N-carbamylimides directly without isolation of the intermediate cis esters. The former process is preferred because a little of the N-carbamylimide always reacts with the water in the medium to form some N-carbamylamic acid.

The amine can be any tertiary amine which has in water a pH less than about 10, and which has no alcoholic hydroxyl groups. Typical amines are pyridine, the picolines, the lutidines, quinoline, 2-methyl-5-ethylpyridine, 2-methyl-5-vinylpyridine, and N,N-dimethylaniline. I prefer to use pyridine because of its high activity and water solubility.

Tertiary amines which have a pH higher than about 10 do not catalyze the cis-trans isomerization, perhaps because they catalyze the hydrolysis of the cis ester. Such inoperable amines are trimethylamine, triethylamine, etc.

The alcohol can be any which contains one or two non-tertiary alcoholic hydroxyl groups, and which lacks amine groups or carboxyl groups. Typical alcohols are the monohydric alkanols, e. g., methanol, ethanol, 1-propanol, 2-propanol, the non-tertiary butanols, 2-ethylhexan-1-ol, 1-dodecanol, 1-octadecanol; the unsaturated alcohols, e. g., allyl alcohol and methallyl alcohol; the halogenated alcohols, e. g., ethylene chlorohydrin; the ether-acohols, e. g., ethylene glycol monomethyl ether and diethylene glycol monoethyl ether; the cycloalkanols, e. g., cyclohexanol; the aralkanols, e. g., benzyl alcohol; the cyanoalkanols, e. g., beta-cyanoethanol; and the dihydric alcohols, e. g., ethylene glycol, propylene glycol, trimethylene glycol and tetramethylene glycol.

Any amount of water between about 10 parts and about 1000 parts per 100 parts (all by weight) of cis ester or of N-carbamylimide can be used.

At least about one part of the tertiary amine per 100 parts of ester or imide is used. Larger amounts, up to about 100 parts, of the amine speed up the isomerization. Preferably, I use between about 2 parts and about 60 parts to obtain a suitable balance between speed and economy.

Some of the cis esters and tertiary amines employed are so nearly insoluble in water that the isomerization is very slow. In that case a water-miscible organic solvent which does not react with the amine or ester can be added. Such solvents are the lower alkanols such as methanol, ethanol, and the propanols; dioxan; acetone, and butanone.

The following examples illustrate the invention. All parts and percentages are by weight:

Example 1

A mixture of 51.6 parts of methyl maleurate (methyl N-carbamylmaleamate), 23.7 parts of pyridine and 180 parts of water was shaken at room temperature. Within 20 minutes the mixture became so thick with a fine crystalline precipitate that it could not be agitated by shaking. The white solid was filtered, washed with water, then with ether, and dried in air. The yield of methyl N-carbamylfumaramate was 45 parts, or 87% of theory. It melted at 230–232° C. A known sample of methyl N-carbamylfumaramate (made as described by Pliny O. Tawney, U. S. Patent No. 2,721,186) melted at 228–230° C. A mixture of the two products also melted at 228–230° C., which proved the structure of the ester made by my new process.

Example 2

The experiment of Example 1 was duplicated except that the isomerization was run at 50° C. The yield of the trans ester was 45.5 parts, or 88% of theory. It melted at 230–232° C.

Example 3

A mixture of 10.3 parts of methyl maleurate, 0.36 part of pyridine and 36 parts of water was shaken at room temperature for 18 hours. The white solid was filtered, washed with methanol, then with ether, and air dried. The yield of methyl N-carbamylfumaramate was 7.0 parts, or 68% of theory. It melted at 229–230° C.

Comparison between this example and Example 1 shows the effect of varying the proportion of the pyridine.

Example 4

A mixture of 14.0 parts of N-carbamylmaleimide, 80 parts of methanol, 100 parts of water and 7.9 parts of pyridine was kept at room temperature. Within 5 minutes all of the N-carbamylmaleimide had disappeared. Within 30 minutes methyl N-carbamylfumaramate began to crystallize from the solution. After 24 hours the white ester was filtered, washed and dried. The yield was 12.5 parts, or 73% of theory. Melting point, 230–231° C.

This example shows that methyl N-carbamylfumaramate can be made directly from N-carbamylmaleimide and aqueous methanol in high yield, without isolation of the intermediate methyl N-carbamylmaleamate, despite the fact that N-carbamylmaleimide and water form maleuric acid easily.

Example 5

A mixture of 21.4 parts of n-butyl maleurate (M. P. 95–99° C.), 7.9 parts of pyridine and 100 parts of water was left at room temperature over night. White, crystalline n-butyl N-carbamylfumaramate was filtered, washed with water, then with ether, and air dried. The yield was 17.5 parts, or 82% of theory. It melted at 170–172° C.

Example 6

A mixture of 20.2 parts of 2-hydroxyethyl maleurate (M. P. 131.0–131.5° C.), 7.9 parts of pyridine and 100 parts of water was left at room temperature over night. White, crystalline 2-hydroxyethyl N-carbamylfumaramate began to precipitate within 30 minutes after mixing. The ester was filtered, washed with water, and air dried. The yield was 16.0 parts, or 80% of theory. It melted at 184–186° C. after recrystallization from water.

Example 7

A mixture of methyl maleurate, 2,6-lutidine and water was shaken at room temperature. Methyl N-carbamylfumaramate was formed.

Similarly, aqueous 2-methyl-5-ethylpyridine catalyzed the conversion of methyl maleurate to methyl N-carbamylfumaramate.

Example 8

A mixture of 8.6 parts of methyl maleurate, 6.0 parts of dimethylaniline, 41 parts of water and 32.5 parts of methanol formed a homogeneous solution immediately at room temperature. Within 40 minutes tiny, shining, white needles of methyl N-carbamylfumaramate began to crystallize from solution. The mixture was left for several hours although crystallization seemed to have stopped after the first few hours. The trans ester was filtered, washed with ether, and air dried. The yield was 6.15 parts, or 72% of theory. It melted at 232–233° C. without recrystallization.

Example 9

The experiment of Example 8 was duplicated except that the amine was 2-methyl-5-vinylpyridine. The trans ester began to crystallize from the clear solution within 40 minutes after mixing. The yield was 2.7 parts, or 31% of theory. Melting point, 232–233° C.

Example 10

The experiment of Example 8 was duplicated except that the amine was pyridine (4.0 parts). The trans ester began to crystallize from the clear solution within 20 minutes after mixing. The yield was 7.8 parts, or 91% of theory. Melting point, 232–233° C.

Having thus described my invention what I claim and desire to protect by Letters Patent is:

1. In a process of making esters of trans N-carbamylamic unsaturated acids and non-tertiary alcohols by cis-trans isomerization of the same ester of the corresponding cis N-carbamylamic unsaturated acids, the improvement which consists in the step of isomerizing the ester of the said cis acid in the presence of water and a tertiary amine having a pH value in water not in excess of about 10.

2. A process as set forth in claim 1 in which the cis ester is preformed.

3. A process as set forth in claim 1 in which the cis ester is formed, in situ, from reaction of a non-tertiary alcohol and an N-carbamylimide of the cis N-carbamylamic unsaturated acid and is immediately isomerized to the trans ester.

4. In a process of making esters of trans N-carbamylamic unsaturated acids and non-tertiary alcohols by cis-trans isomerization of the same ester of the corresponding cis N-carbamylamic unsaturated acids, the improvement which consists in the step of isomerizing the ester of the said cis acid in the presence of water and pyridine.

5. In a process of making esters of trans N-carbamylamic unsaturated acids and non-tertiary alcohols by cis-trans isomerization of the same ester of the corresponding cis N-carbamylamic unsaturated acids, the improvement which consists in the step of isomerizing the ester of the said cis acid in the presence of water and N,N-dimethylaniline.

6. In a process of making esters of trans N-carbamylamic unsaturated acids and non-tertiary alcohols by cis-trans isomerization of the same ester of the corresponding cis N-carbamylamic unsaturated acids, the improvement which consists in the step of isomerizing the ester of the said cis acid in the presence of water and 2,6-lutidine.

7. In a process of making esters of trans N-carbamylamic unsaturated acids and non-tertiary alcohols by cis-trans isomerization of the same ester of the corresponding cis N-carbamylamic unsaturated acids, the improvement which consists in the step of isomerizing the ester of the said cis acid in the presence of water and 2-methyl-5-vinylpyridine.

8. In a process of making esters of trans N-carbamylamic unsaturated acids and non-tertiary alcohols by cis-trans isomerization of the same ester of the corresponding cis N-carbamylamic unsaturated acids, the improvement which consists in the step of isomerizing the ester of the said cis acid in the presence of water and 2-methyl-5-ethylpyridine.

References Cited in the file of this patent

Pfeiffer: Berichte, v. 47, p. 1592 (1914).